Aug. 29, 1961   J. W. CROCKETT   2,998,239
COMBINATION AUTO SPRING AND SHOCK ABSORBER
Filed June 18, 1957   3 Sheets-Sheet 1

INVENTOR.
JOHN W. CROCKETT
BY
Bean, Brooks, Buckley & Bean
ATTORNEYS

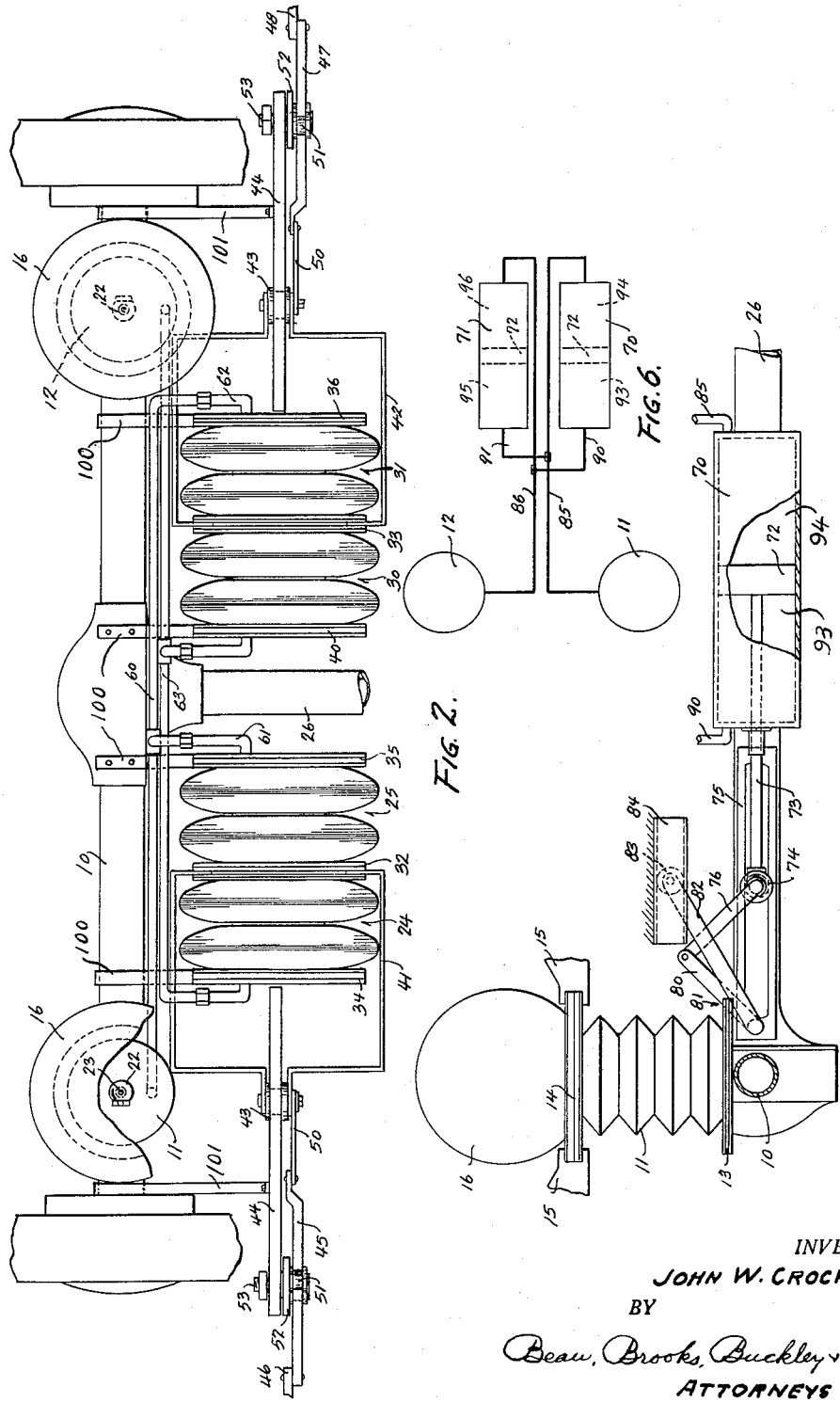

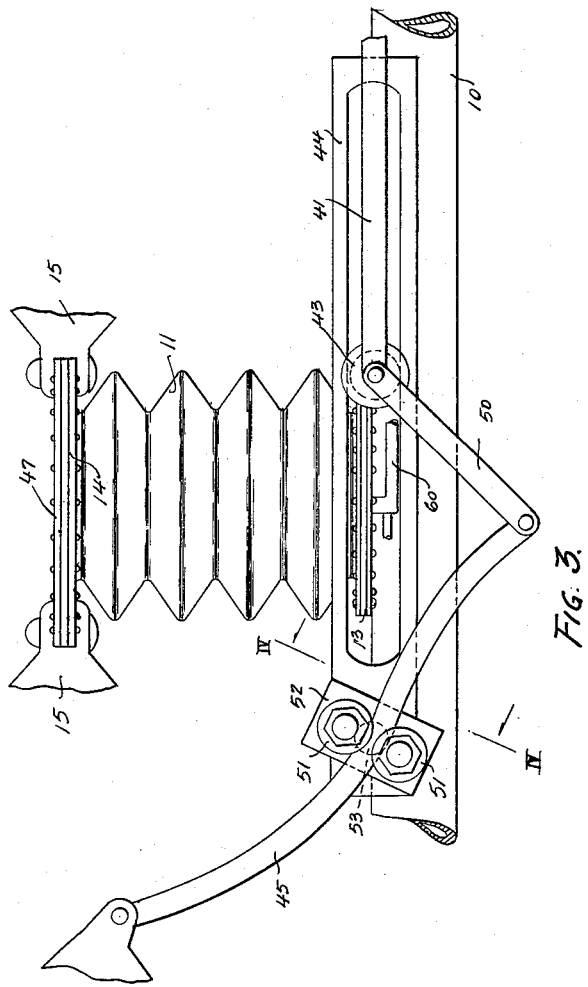
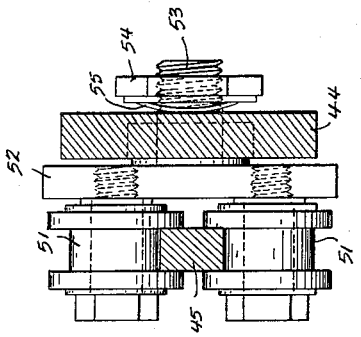

United States Patent Office 2,998,239
Patented Aug. 29, 1961

2,998,239
COMBINATION AUTO SPRING AND
SHOCK ABSORBER
John William Crockett, Buffalo, N.Y.
(139 Reo Ave., Cheektowaga 11, N.Y.)
Filed June 18, 1957, Ser. No. 666,453
16 Claims. (Cl. 267—11)

My invention relates in general to motor vehicles, and in particular to an air spring suspension and shock control device.

It is well known to those skilled in the art that when rounding a curve, an automobile will tend to tip and will be depressed on the side adjacent the outside of the curve while it will be elevated at the side adjacent the inside of the curve.

The principal object of my invention is to provide a stabilizer for use on motor vehicles by which the normal equilibrium of the vehicle will be maintained during movement which would ordinarily cause the vehicle to heel and sway.

Another object is to provide an air spring suspension for motor vehicles, whereby relatively a smooth ride may be had and one which will be substantially free from bounces and jars.

A further object is to provide an air spring which shall include a shock control, whereby rebound may be restricted.

Moreover, my invention is so designed that the pressure of air in the springs, and, therefore, the firmness of the ride, may be controlled at will from the driver's seat thereby regulating the riding characteristics of the vehicle to suit the load or the rider's comfort.

Furthermore, my device is provided with stabilizing bellows whereby increased pressure produced in the spring bellows on one side of the chassis will be counteracted by a reduced pressure produced in the spring bellows on the other side of the vehicle.

The above objects and advantages have been accomplished by the device shown in the accompanying drawings, of which:

FIG. 2 is a fragmentary plan view of FIG. 1;

FIG. 3 is an enlarged fragmentary side elevation of a modified form of invention;

FIG. 4 is an enlarged sectional view taken on line IV—IV of FIG. 3;

FIG. 5 is a fragmentary end elevation of a modified form of invention; and

FIG. 6 is a diagrammatic view showing the arrangement of parts illustrated in FIG. 5.

Figure 1:
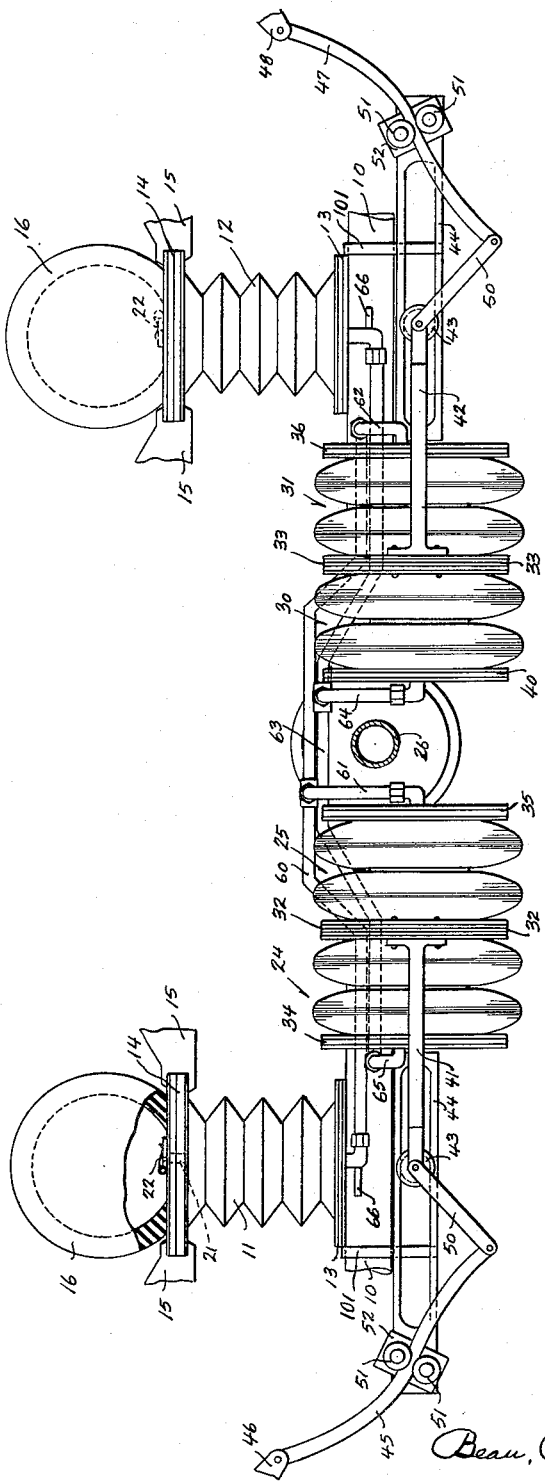
FIG. 1 is a front elevation of my device, showing it attached to a vehicle in a somewhat diagrammatic manner.

Referring to the form of invention shown in FIGS. 1 and 2, for convenience of illustration, I have shown my device attached to the rear axle of a vehicle. As shown here, the invention comprises spring bellows 11 and 12, one arranged at each side of the axle and each carrying a plate 13 at its lower end, for suitable securement to the axle 10, and with a plate 14 at its upper end for attachment to suitable lugs 15 carried by the body of the vehicle. The plates 13 and 14 are secured to the ends of these bellows in air-tight manner. For convenience, the lugs 15 are shown in fragmentary manner, it being understood that they are a part of the body of the vehicle, and constitute the means for securing my device to the body of the vehicle. Each of these bellows is made of suitable flexible material so that they may expand and collapse with the relative movement between the body and the axle.

In this form of my invention, an auxiliary spring air compartment 16 is provided for each of the bellows 11 and 12. Each of these compartments is carried by the upper plate 14 of the bellows and may be made of suitable expansive material such as very heavy rubber, neoprene or the like, or of non-expansive material such as thin metal. In order that the spring bellows 11 and 12 act as shock absorbing units, the plate 14 of each is provided with an opening 21 in communication with the interior of the compartment, said opening being of such size as to permit air to quickly pass from the bellows into the compartment. However, passage of the air from the compartment to the bellows is restricted by means of a spring pressed valve 22 having a relatively small bleeder hole 23.

Supplementing the use of the spring bellows, I provide a series of stabilizing bellows. Two of such bellows 24 and 25 are arranged in tandem and are located at one side of the longitudinal center line of the vehicle and between the torque tube 26 and the spring bellows 11, and two of such bellows 30 and 31 are also arranged in tandem and are located at the opposite side of the center line of the vehicle and between the torque tube 26 and the spring bellows 12. A rigid junction plate 32 is arranged between the stabilizing bellows 24 and 25, and a similar junction plate 33 is arranged between the stabilizing bellows 30 and 31. The junction plates are secured to the adjacent end of the stabilizer bellows in air-tight manner. A bellows plate 34 is arranged at the outer end of the stabilizing bellows 24 and a similar bellows plate 35 is arranged at the outer end of the stabilizing bellows 25. A bellows plate 36 is secured to the outer end of the stabilizing bellows 31, and a similar plate 40 is secured at the outer end of the stabilizing bellows 30. The outer ends of each of the stabilizing bellows are stationarily arranged by having the bellows plates thereof secured in suitable manner to the axle 10 as by the brackets 100 shown in diagrammatic manner, whereby they will be fixed against axial movement. Each of the junction plates 32 and 33 between the stabilizing bellows are, however, movable back and forth axially between the bellows causing them to expand and contract in reverse manner. As shown in FIG. 2, a yoke 41 is carried by the junction plate 32, and a yoke 42 is carried by the junction plate 33. The outer end of each these yokes supports a roller 43 which is movably mounted within a track 44, whereby the outer end of the yoke is guided in its reciprocating movement. These tracks, like the pair of stabilizing bellows and their bellow supporting plates, are supported by suitable brackets 101 attached to the rear axle 10 and shown in diagrammatic manner whereby they are stationarily held in position.

The rollers 43 and the attached yokes 41 and 42 are reciprocated back and forth as the body moves to and from the axle of the chassis, and this is accomplished by means of articulating levers 45 and 47, respectively. The upper end of each of these levers is attached to the body by means of a suitable mount 46 and 48, respectively, and at the lower end each of these levers is connected to a link 50, the upper end of which is secured to one of the yokes 41 and 42 of the stabilizing bellows. Each of the articulating levers is reversely curved, as clearly shown in FIGS. 1 and 3, and each is slidably supported by spaced articulating rollers 51 which are grooved to receive and guide the lever in its travel between them. The rollers are carried by a swivel mount 52 which is provided with a swivel stud 53. This stud passes through a suitable bearing formed in the track 44, and each is held in frictional contact therewith by means of a nut 54 and a spring washer 55.

As clearly shown in FIGS. 1 and 2, the plate 13 at the lower end of the spring bellows 11 is connected by a conduit 60 and by branch conduits 61 and 62 to the plates 35 and 36, respectively, of the stabilizing bellows 25 and 31, respectively. Air within the spring bellows 11 will, therefore, be in communication with the air within the stabilizing bellows 25 and 31. In like manner the plate 13 of the spring bellows 12 is connected to the plates 34 and 40 of the stabilizing bellows 24 and 30, respectively, by means of a conduit 63 and by branch conduits 64 and 65, respectively, whereby air within the spring bellows 12 will be in uninterrupted communication with the air in the stabilizing bellows 30 and 24. Each of these individual air systems is provided at some convenient place with an air valve 66, whereby suitable air pressure may be initially supplied to the system and whereby it may be replenished in case of leakage thereof.

While I have shown the spring bellows as provided with a spring reservoir, it may be desirable in some installations to omit this element and to substitute the modified form of invention shown in FIG. 3 where the top of the spring bellows 11 is closed by means of an impervious plate 47.

A further modification is shown in FIGS. 5 and 6. Air cylinders 70 and 71 are shown in place of the stabilizing bellows 24, 25, 30 and 31. The cylinders are arranged on each side of the longitudinal center line of the vehicle and are carried by the torque tube 26 attached to the axle housing of the chassis. In this form of invention a piston 72 is disposed in each of the cylinders 70 and 71 and divides the cylinders into tandem arranged air chambers 93—94 and 95—96, respectively. The piston of each cylinder is carried by a piston rod 73 having a guide roller 74 at its forward end which is slidably mounted within a track 75, suitably supported by the torque tube 26 and the axle 10. The forward end of the piston rod 73 is pivotally attached to one end of a link 76, the upper end of which is pivotally secured to the arm 80 of a bellcrank 81. The bellcrank is pivotally mounted upon the track 75 and the other arm 82 thereof extends upwardly and carries a roller 83 at its upper end which is slidably mounted within a guide member 84, suitably supported by the vehicle body. In FIG. 5 the cylinder 70 and its associated parts are shown, but it will be obvious that similar parts are provided for the cylinder 71 which for convenience of illustration have not been shown. As shown in FIG. 6, the spring bellows 11, represented by the circle in this figure, is connected to the air chamber 94 at the inner end of the cylinder 70 by means of a conduit 85, and the air chamber 96 at the inner end of the cylinder 71 is connected to spring bellows 12, represented by the circle, by means of a conduit 86. The chamber 93 at the outer end of cylinder 70 is connected to the conduit 86 by means of a conduit 90 and the chamber 95 at the outer end of the cylinder 71 is connected by means of a conduit 91 to the conduit 85.

Obviously, while I have shown the cylinders arranged substantially parallel to the torque tube 26, these cylinders may be used in place of and be disposed in the same relative positions as the bellows 24—25 and 30—31.

Normally when a vehicle equipped with a conventional suspension system is rounding a right-hand curve, the left-hand side of the vehicle tends to heel while the right-hand side of the vehicle tends to rise. Conversely, the opposite condition manifests itself when the vehicle is rounding a left-hand curve. The purpose of my invention is to eliminate this uncomfortable and often dangerous attitude of a vehicle when rounding curves or when loaded unevenly, while at one and the same time producing an unusually soft floating ride free from bounce and jar.

Referring now to the form of invention shown in FIGS. 1 and 2, it will be obvious that when a vehicle equipped with my invention is proceeding forwardly and is rounding a right-hand curve, the left-hand side of the body of the vehicle will tend to heel, thereby depressing the hinged body mount 48 and the outer end of the articulating lever 47. The depressing of this hinge mount will force the articulating lever 47 through the articulating guide rollers 51 whose swivel mount is free to conform to the changing plane of travel of articulating lever 47. This motion compresses the stabilizing bellows 30 and expands the stabilizing bellows 31 through the medium of the connecting link 50, guide roller 43, yoke 42 and junction plate 33. The compression of stabilizing bellows 30 will force additional air under increased pressure into air spring 12 through the connecting conduit 63 and branch conduit 64, which action will partially compensate for the additional load to which air spring 12 is being subjected. Simultaneously, stabilizing bellows 30 will force air under increased pressure into stabilizing bellows 24 through connecting conduit 63 and branch conduits 64 and 65.

The expansion of stabilizing bellows 31 will now allow this bellows to accept air from air spring 11 through connecting conduit 60 and branch conduit 62 and to also accept air from stabilizing bellows 25 through connecting conduit 60 and branch conduits 61 and 62. This latter transfer of air pressures is also twofold in purpose inasmuch as the support of air spring 11 on the right-hand side of the vehicle has been lessened while at the same time the pressure in stabilizing bellows 25 has been relieved sufficiently to allow the increased pressure in stabilizing bellows 24 to expand that bellows more fully and hence to move the junction plate 32 inwardly so that the tendency of the vehicle to rise on the right-hand side will be snubbed through the medium of the yoke 41, associated link 50, the articulating lever 45 and the hinged lever mount 46.

When either spring bellows 11 or 12 is compressed, air will rush from the spring bellows into the auxiliary spring 16 past the spring pressed valve 22 and through the aperture 21. However, when either spring bellows tends to resume its normal position, the rebound will be snubbed by the passage of air through the restricting orifice 23 of the spring pressed valve 22. This shock and bounce control action is further complemented by the controlled transfer of pressure volumes between the air springs and their respective stabilizer bellows association.

Obviously, when the vehicle is rounding a left-hand curve, the right-hand side of the vehicle body will tend to heel thereby depressing the articulating hinged body mount 46 which will carry with it articulating lever 45 which by means of its connection to junction plate 32 will cause this plate to move inwardly thus compressing stabilizing bellows 25 and expanding stabilizing bellows 24. The compression of stabilizing bellows 25 will force additional air under pressure into air-spring 11 through connecting conduit 60 and branch conduit 61 while at the same time air under pressure will also be forced into stabilizing bellows 31 through connecting conduit 60 and branch conduits 61 and 62. The reduced pressure now in stabilizing bellows 24 will allow this bellows to receive air from, and to relieve the resultant increased pressure in stabilizing bellows 30 brought about by the increased pressure in stabilizing bellows 31 and the resultant inward motion of junction plate 33. This last mentioned transfer of air is by way of connecting conduit 63 and branch conduits 64 and 65. The reduced pressure in stabilizing bellows 24 will also accept air from air spring 12 through connecting conduit 63 and branch conduit 65, which action will tend to lower this side of the vehicle. The inward motion of junction plate 33 through its connective linkage and resultant action on articulating lever 47 and hinged body mount 48 will further snub the tendency of the left-hand side of the vehicle to rise.

In view of the above, it will be obvious, that both sides of the vehicle equipped with my invention will be substantially balanced so that if there is a greater weight upon one side of the vehicle than the other, the vehicle will be leveled or stabilized.

Obviously, while I have shown the spring bellows as provided with a valve opening for use as a shock absorber, it is within the scope of my invention to utilize the auxiliary spring simply as a space for the accommodation of additional compressed air in which case it may be connected to the spring bellows through a large opening in the upper plate 14 of the bellows, whereby air will be permitted to pass freely in either direction between these two parts of the invention. Air to either of the bellows systems may be initially supplied and/or replenished from an outside source or from a small compressor provided on the vehicle and controlled from the driver's seat by suitable valve mechanism (not shown) mounted upon the instrument panel of the vehicle and readily accessible. By such control the character of the ride may be regulated at will to suit the rider's comfort or the weight of the load carried by the vehicle.

What is claimed is:

1. In a motor vehicle, the combination with the body and the axle thereof, of a spring suspension, comprising a pair of air-tight spring bellows under air pressure mounted between said body and said axle, opposed stabilizing bellows carried by said axle and arranged in tandem, a bellows plate secured to each of the outer ends of said opposed stabilizing bellows and fixed to said axle, a junction plate intermediately disposed between said stabilizer bellows and secured to the adjacent inner ends thereof for free axial movement therewith, a yoke connected to said junction plate, a track for said yoke carried by said axle, a roller carried by said yoke for engagement with said track, means associated with said roller and connected to said body to cause the reciprocation of said yoke, conduit means connecting each of said spring bellows to the bellows flange of the associated stabilizer bellows, whereby the increased and reduced pressures produced in the spring bellows will be augmented by respective increased and reduced pressures produced in the associated stabilizing bellows.

2. In a motor vehicle, the combination with the body and the axle thereof, of a spring suspension, comprising a pair of air-tight spring bellows under air pressure mounted between said body and said axle, opposed stabilizing bellows carried by said axle and arranged in tandem, a bellows plate secured to each of the outer ends of said opposed stabilizing bellows and fixed to said axle, a junction plate intermediately disposed between said stabilizer bellows and secured to the adjacent inner ends thereof for free axial movement therewith, a yoke connected to said junction plate, a track for said yoke carried by said axle, a roller carried by said yoke and in engagement with said track, a swivel mount pivotally carried by said track, an articulating lever slidably carried by said swivel mount and pivotally attached at its outer end to said body, a link connecting the inner end of said lever to said yoke, conduit means connecting each of said spring bellows to the bellows flange of the associated stabilizer bellows, whereby the increased and reduced pressures produced in the spring bellows will be augmented by respective increased and reduced pressures produced in the associated stabilizing bellows.

3. In a motor vehicle, the combination with the body and the axle thereof, of a spring suspension, comprising a pair of air-tight spring bellows under air pressure mounted between said body and said axle, one of said spring bellows being arranged at the right-hand side of said axle and the other spring bellows being arranged at the left-hand side thereof, a pair of opposed stabilizing bellows for each spring bellows composed of an inner stabilizing bellows and an outer stabilizing bellows, a bellows plate secured to each of the outer ends of each pair of opposed stabilizing bellows and fixed to said axle, a junction plate disposed between each pair of opposed stabilizer bellows and secured to the adjacent inner ends thereof for free axial movement therewith, a yoke connected to each junction plate, a track for each yoke carried by said axle, a roller carried by each yoke and in engagement with said track, a swivel mount pivotally carried by each of said tracks, an articulate lever slidably carried by each of said swivel mounts and pivotally attached at its outer end to said body, a link connecting the inner end of each of said levers to said yoke, conduit means connecting the right-hand spring bellows with the inner stabilizing bellows of the right-hand pair and with the outer stabilizing bellows of the left-hand pair, and separate conduit means connecting the left-hand spring bellows with the outer stabilizing bellows of the right-hand pair and with the inner stabilizing bellows of the left-hand pair, whereby the increased and reduced pressures produced in the spring bellows will be augmented by the respective increased and reduced pressures produced in the opposite stabilizing bellows.

4. In a motor vehicle, the combination with the body and the axle thereof, of a spring suspension, comprising a pair of air-tight spring bellows under air pressure mounted between said body and said axle and arranged on opposite sides of the longitudinal center line of said body, a pair of opposed stabilizing bellows carried by said axle and arranged in tandem on each side of said center line, each pair of said stabilizing bellows consisting of an inner bellows and an outer bellows, a bellows plate secured to the inner end of each of the inner stabilizing bellows and to the outer end of each of the outer stabilizing bellows, said bellows plates being fixed to said axle, a junction plate secured between and to the adjacent ends of each pair of inner and outer stabilizing bellows for free axial movement therewith, means connecting said junction plates to said body for causing reciprocation thereof, conduit means connecting the spring bellows at the right-hand side of said center line to the outer stabilizing bellows on the left-hand side of the center line and to the inner stabilizing bellows on the right-hand side of the center line, and separate conduit means connecting the left-hand spring bellows with the outer stabilizing bellows of the right-hand pair and with the inner stabilizing bellows of the left-hand pair, whereby the increased and reduced pressures produced in the spring bellows will be augmented by the respective increased and reduced pressures produced in the associated stabilizing bellows.

5. In a motor vehicle, the combination with the body and the axle thereof, of a spring suspension, comprising a pair of air-tight spring bellows under air pressure mounted between said body and said axle and arranged on opposite sides of the longitudinal center line of said body, one of said spring bellows being arranged at the right-hand side of the center line of said body and the other spring bellows arranged on the left-hand side of said center line, a pair of opposed stabilizing bellows for each spring bellows, each pair of said stabilizing bellows being arranged in tandem, one pair of stabilizing bellows being arranged on the right-hand side of said center line, and the other pair of stabilizing bellows being arranged on the left-hand side thereof, each pair of stabilizing bellows consisting of an inner bellows and an outer bellows, a bellows plate secured to the inner end of each of said inner stabilizing bellows and a separate bellows plate secured to the outer end of each of said outer stabilizing bellows, said stabilizing bellows plates being fixed to said axle, a junction plate secured between and to the adjacent end of each pair of inner and outer stabilizing bellows for free axial movement therewith, yoke means attached to each of said junction plates, means connecting each yoke to said body for causing the reciprocation of said junction plates, conduit means connecting the right-hand spring bellows with the inner stabilizing bellows of the right-hand pair and with the outer stabilizing bellows of the left-hand pair, and separate conduit means connecting the left-hand spring bellows with the outer stabilizing bellows of the right-hand pair and with the inner stabilizing bellows of the left-hand pair, whereby the increased and reduced pressures produced in said spring bellows will be augmented by the respective increased and reduced pressures produced in the associated stabilizing bellows.

6. In a motor vehicle, the combination with the body and the axle thereof, of a spring suspension, comprising a right-hand and a left-hand air-tight spring bellows under pressure mounted between said body and said axle and arranged on opposite sides of the longitudinal center line of said body, a double acting air cylinder for each of said spring bellows carried by said body and arranged one on each side of said center line, each cylinder having an inner air chamber and an outer air chamber separated by a reciprocating piston, conduit means connecting the right-hand spring bellows to the outer air chamber of the left-hand air cylinder and to the inner air chamber of the right-hand air cylinder, separate conduit means connecting the left-hand spring bellows to the outer air chamber of the right-hand air cylinder and to the inner end of the left-hand air cylinder, and means carried by said body and connected to said reciprocating pistons to cause increased pressure in one air chamber and decreased pressure in the opposed air chamber, whereby the increased and reduced pressures produced in the spring bellows will be augmented by the respective increased and reduced pressures produced in the associated air cylinders.

7. A spring suspension, comprising a right-hand and a left-hand air-tight spring bellows under air pressure mounted between the body and axle of a vehicle and arranged one on each side of the longitudinal center line of the vehicle, a pair of opposed stabilizing bellows for each of said spring bellows carried by said axle and arranged in tandem one pair on each side of said center line, each comprising an inner and an outer stabilizing bellows, a bellows plate secured to the outer and inner end of said pair of opposed stabilizing bellows and fixed to said axle, a junction plate intermediately disposed between each pair of said stabilizing bellows and secured to the adjacent inner ends thereof for free axial movement therewith, means connecting said junction plate to said body for causing the reciprocation of said junction plate, conduit means connecting each of said spring bellows to the inner stabilizing bellows of the adjacent pair and to the outer stabilizing bellows of the opposite pair, whereby the increased and reduced pressures produced in the opposite spring bellows will be augmented by respective increased and reduced pressures produced in the associated stabilizing bellows.

8. A spring suspension, comprising a right-hand and a left-hand air-tight spring bellows under air pressure mounted between the body and axle of a vehicle and arranged one on each side of the longitudinal center line of the vehicle, a pair of opposed stabilizing bellows for each of said spring bellows carried by said axle and arranged in tandem, one pair on each side of said center line, a bellows plate secured to the outer end of each of said opposed stabilizing bellows and fixed to said axle, a junction plate intermediately disposed between each pair of said stabilizing bellows and secured to the adjacent inner ends thereof for free axial movement therewith, means connecting said junction plate to said body for causing the reciprocation of said junction plate, conduit means connecting the right-hand spring bellows to the left-hand stabilizing belows of each pair of stabilizing bellows, and conduit means connecting the left-hand spring bellows to the right-hand stabilizing bellows of each pair of stabilizing bellows, whereby the increased and reduced pressures produced in the spring bellows will be augmented by respective increased and reduced pressures produced in the associated stabilizing bellows.

9. In a motor vehicle, the combination with the body and the axle thereof, of a spring suspension, comprising a pair of air-tight spring bellows under air pressure mounted between said body and said axle and arranged on opposite sides of the longitudinal center line of said body, an auxiliary air compartment mounted on top of each spring bellows, a valve formed with a bleeder opening for permitting egress of air from said spring bellows into said auxiliary air compartment but restricting flow in opposite direction, a pair of opposed stabilizing bellows carried by said axle and each pair arranged in tandem on each side of said center line, each pair of said stabilizing bellows consisting of an inner bellows and an outer bellows, a bellows plate secured to the inner end of each of the inner stabilizing bellows and to the outer end of each of the outer stabilizing bellows, said bellows plates being fixed to said axle, a junction plate secured to the adjacent ends of each pair of inner and outer stabilizing bellows for free axial movement therewith, means connecting said movable plates to said body for causing reciprocation thereof, conduit means connecting the spring bellows at the right-hand side of said center line to the outer stabilizing bellows on the left-hand side of the center line and to the inner stabilizing bellows on the right-hand side of the center line, and conduit means connecting the spring bellows at the left-hand side of said center line to the outer stabilizing bellows on the right-hand side of the center line and to the inner stabilizing bellows on the left-hand side of the center line, whereby the increased and reduced pressures produced in the spring bellows will be augmented by the respective increased and reduced pressures produced in the associated stabilizing bellows.

10. In a motor vehicle, the combination with the body and the axle thereof, of a spring suspension, comprising a right-hand and a left-hand air-tight spring bellows under pressure mounted between said body and said axle and arranged on opposite sides of the longitudinal center line of said body, an auxiliary air compartment mounted on top of each spring bellows, a valve formed with a bleeder opening for permitting egress of air from said spring bellows into said auxiliary air compartment but restricting flow in opposite direction, a double acting air cylinder for each of said spring bellows carried by said axle and arranged one on each side of said center line, each cylinder having a forward air chamber and a rearward air chamber separated by a reciprocating piston, conduit means connecting the right-hand spring bellows to the outer air chamber of the left-hand air cylinder and to the inner air chamber of the right-hand air cylinder, separate conduit means connecting the left-hand spring bellows to the outer air chamber of the right-hand air cylinder and to the inner end of the left-hand air cylinder, and means carried by said body and connected to said reciprocating pistons to cause increased pressure in one air chamber and decreased pressure in the opposed air chamber, whereby the increased and reduced pressures produced in the spring bellows will be augmented by the respective increased and reduced pressures produced in the associated air cylinders.

11. In a motor vehicle, the combination with the body and the axle thereof, of a spring suspension, comprising a pair of air-tight spring bellows under air pressure mounted between said body and said axle and arranged on opposite sides of the longitudinal center line of said body, a pair of opposed stabilizing air chambers fixed to said axle and arranged in tandem on each side of said center line, each pair of said stabilizing air chambers consisting of an inner chamber and an outer chamber, junction means disposed intermedially between each pair of inner and outer stabilizing chambers for free axial movement therewith, means connecting said junction means to said body for causing reciprocation thereof, conduit means connecting the spring bellows at the right-hand side of said center line to the outer stabilizing chamber on the left-hand side of the center line and to the inner stabilizing chamber on the right-hand side of the center line, and separate conduit means connecting the left-hand spring bellows with the outer stabilizing chamber of the right-hand pair and with the inner stabilizing chamber of the left-hand pair, whereby the increased and reduced pressures produced in the spring bellows will be augmented by the respective increased and reduced pressures produced in the associated stabilizing chambers.

12. A spring suspension, comprising a right-hand and a left-hand air-tight spring bellows under air pressure mounted between the body and axle of a vehicle and arranged one on each side of the longitudinal center line of the vehicle, a pair of opposed inner and outer stabilizing air chambers for each of said spring bellows arranged in tandem on each side of said center line and fixed to said axle, junction means disposed intermediately between each pair of said stabilizing chambers for free axial movement therewith, means connecting said body to said junction means for causing reciprocation thereof, conduit means connecting each of said spring bellows to the inner stabilizing air chamber of the adjacent pair and to the outer stabilizing air chamber of the opposite pair, whereby the increased and reduced pressures produced in each of said spring bellows will be augmented by respective increased and reduced pressures produced in the associated stabilizing air chambers.

13. In a motor vehicle, the combination with the body and the axle thereof, of a spring suspension, comprising a pair of air-tight spring bellows under air pressure mounted between said body and said axle and arranged on opposite sides of the longitudinal center line of said body, a pair of opposed stabilizing air chambers fixed to said axle and arranged in tandem on each side of said longitudinal center line, each pair of said stabilizing air chambers consisting of an inner chamber and an outer chamber, junction means disposed intermediately between each pair of inner and outer stabilizing chambers for free axial movement therewith, means connecting said junction means to said body for causing reciprocation thereof, conduit means connecting the spring bellows at the right-hand side of said center line to the outer stabilizing chamber on the left-hand side of the center line and to the inner stabilizing chamber on the right-hand side of the center line, and separate conduit means connecting the left-hand spring bellows with the outer stabilizing chamber on the right-hand side and with the inner stabilizing chamber on the left-hand side, whereby the increased and reduced pressures produced in each of said spring bellows will be augmented by the respective increased and reduced pressures produced in the associated stabilizing chambers.

14. In a motor vehicle, the combination with the body and the axle thereof, of a spring suspension, comprising a pair of air-tight spring bellows under air pressure mounted between said body and said axle and arranged on opposite sides of the longitudinal center line of said body, an auxiliary air compartment mounted on top of each spring bellows and formed with an opening for permitting ingress and egress of air from said spring bellows into said auxiliary air compartment, a pair of opposed stabilizing air chambers fixed to said axle and arranged in tandem on each side of said vertical center line, each pair of said stabilizing air chambers consisting of an inner chamber and an outer chamber, junction means disposed intermediately between each pair of inner and outer stabilizing chambers for free axial movement therewith, means connecting said junction means to said body for causing reciprocation thereof, conduit means connecting the spring bellows at the right-hand side of said center line to the outer stabilizing chamber on the left-hand side of the center line and to the inner stabilizing chamber on the right-hand side of the center line, and separate conduit means connecting the left-hand spring bellows with the outer stabilizing chamber on the right-hand side and with the inner stabilizing chamber on the left-hand side, whereby the increased and reduced pressures produced in each of said spring bellows will be augmented by the respective increased and reduced pressures produced in the associated stabilizing chambers.

15. A spring suspension, comprising a right-hand and a left-hand air-tight spring bellows under air pressure mounted between the body and axle of a vehicle and arranged one on each side of the longitudinal center line of the vehicle, an auxiliary air compartment mounted on top of each spring bellows and formed with an opening for permitting ingress and egress of air from said spring bellows into said auxiliary air compartment, a pair of opposed inner and outer stabilizing air chambers for each of said spring bellows arranged in tandem on each side of said center line and fixed to said axle, junction means disposed intermediately between each pair of said stabilizing chambers for free axial movement therewith, means connecting said body to said junction means for causing reciprocation thereof, conduit means connecting each of said spring bellows to the inner stabilizing air chamber of the adjacent pair and to the outer stabilizing air chamber of the opposite pair, whereby the increased and reduced pressures produced in each of said spring bellows will be augmented by respective increased and reduced pressures produced in the associated stabilizing air chambers.

16. In a motor vehicle, the combination with the body and the axle thereof, of a spring suspension, comprising a pair of air-tight spring bellows under air pressure mounted between said body and said axle and arranged on opposite sides of the longitudinal center line of said body, an auxiliary air compartment mounted on top of each spring bellows and formed with an opening for permitting ingress and egress of air from said spring bellows into said auxiliary air compartment, a pair of opposed stabilizing bellows carried by said axle and each pair arranged in tandem on each side of said center line, each pair of said stabilizing bellows consisting of an inner bellows and an outer bellows, a bellows plate secured to the inner end of each of the inner stabilizing bellows and to the outer end of each of the outer stabilizing bellows, said bellows plate being fixed to said axle, a junction plate secured to the adjacent ends of each pair of inner and outer stabilizing bellows for axial movement therewith, means connecting said junction plates to said body for causing reciprocation thereof, conduit means connecting the spring bellows at the right-hand side of said center line to the outer stabilizing bellows on the left-hand side of the center line and to the inner stabilizing bellows on the right-hand side of the center line, and conduit means connecting the spring bellows at the left-hand side of said center line to the outer stabilizing bellows on the right-hand side of the center line and to the inner stabilizing bellows on the left-hand side of the center line, whereby the increased and reduced pressures produced in the spring bellows will be augmented by the respective increased and reduced pressures produced in the associated stabilizing bellows.

References Cited in the file of this patent

UNITED STATES PATENTS

| | | |
|---|---|---|
| Re. 20,887 | Mercier | Oct. 18, 1938 |
| 1,130,656 | Annable | Mar. 2, 1915 |
| 1,878,756 | Caldwell | Sept. 20, 1932 |
| 1,914,814 | Mercier | June 20, 1933 |